Nov. 6, 1945.                F. JOHNSON                 2,388,547
                        SHAPER TOOL POST HOLD DOWN
                           Filed April 1, 1943
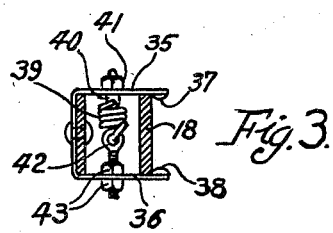
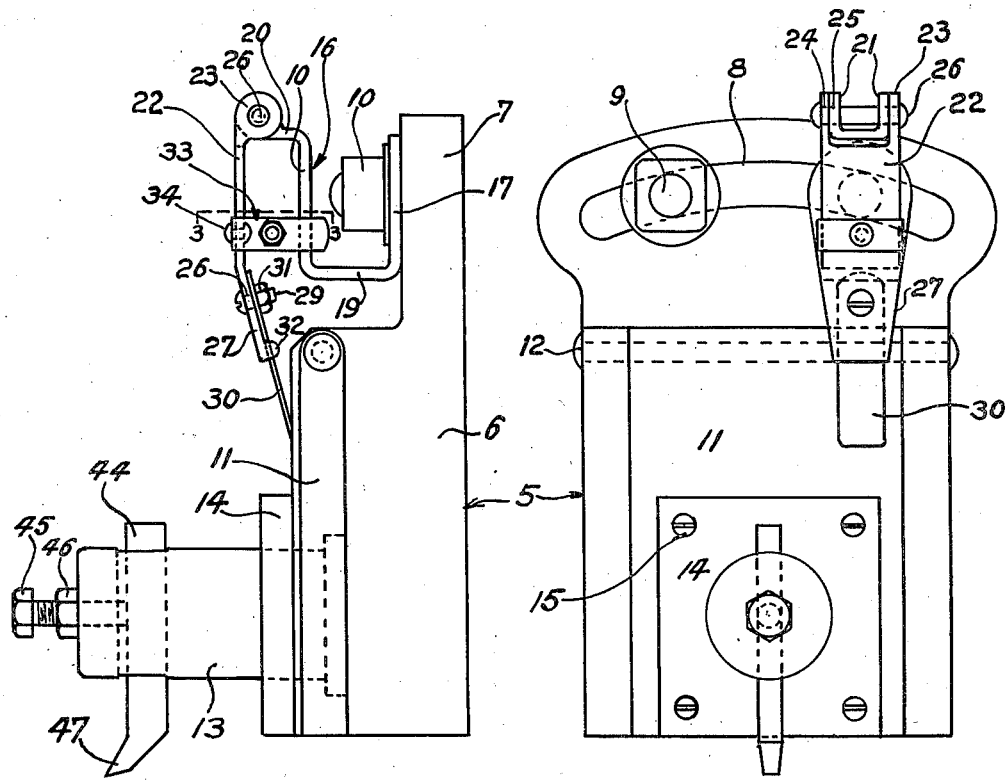
Inventor
FRANCIS JOHNSON.
By Barthel + Bugbee
Attorney Patented Nov. 6, 1945

2,388,547

UNITED STATES PATENT OFFICE 2,388,547

SHAPER TOOL POST HOLD-DOWN

Francis Johnson, Detroit, Mich.

Application April 1, 1943, Serial No. 481,449

15 Claims. (Cl. 90—54)

The present invention relates to improvements in machine tools, and has reference to a tool post hold-down device for shaper machines.

The primary object of the invention is to provide a tool post hold-down for a shaper head to eliminate the necessity of the operator performing this function manually.

Another object of the invention is to provide a hold-down device for a shaper head tool post capable of being attached to certain adjusting nuts on conventional shaper machines so that modifications of the shaper head will not be necessary to incorporate the device therewith.

Another object of the invention is to provide a shaper head hold-down device adapted to maintain the cutting tool in position during its operative stroke and to prevent the same from swinging to an inoperative position through its cutting portion of its stroke when the shaper machine is operated at a comparatively high rate of speed.

Another object of the invention is to provide a hold-down device which is detachably held in position to facilitate the tool post being swung away from the head during the insertion or removal of a tool or the adjustment of a tool already in position.

Another object of the invention is to provide a tool hold-down device for a shaper machine which is constructed of comparatively few parts to become worn or broken and misplaced, whereby the machine will not be out of operation for long periods of time either for the installation of the tool hold-down device or repairs thereto.

Other objects and advantages of the invention will become apparent during the course of the following description of the accompanying drawing wherein:

Fig. 1 is a side elevational view of the invention illustrating the same in position upon a shaper head to maintain the tool in driving contact with the work;

Fig. 2 is a front elevational view of a hold-down device showing the manner in which the same is positioned on one of the conventional adjusting bolts of the shaper head; and Fig. 3 is a horizontal cross sectional view taken on line 3—3 of Fig. 1 looking in the direction of the arrows illustrating the manner in which the hold-down device is detachably mounted to facilitate removal and insertion of the cutting tool.

In the drawing, wherein for the purpose of illustrating the invention and wherein like reference characters will be employed to designate like parts throughout the same, the reference character 5 will generally be employed to indicate an adjustable shaper head which is attached to the reciprocating ram of a shaper machine. The adjustable head comprises a relatively thick lower portion 6 having a reduced upper portion 7 provided with an arcuate slot 8 for receiving the bolts 9 carried by the plunger ram head (not shown). Nuts 10 are usually provided for anchoring the adjustable head 5 in an adjusted position by locating the bolts 9 in the arcuate slot 8 and then tightening the nuts 10 in position.

Hinged to a lower portion 6 of the adjustable shaper head 5 is a hinged plate 11 secured in place by a hinge pintle 12 and said plate is provided with a horizontal tool post 13 secured in place by a plate 14 bolted or otherwise secured to the hinged plate 11 by means of screws or the like 15.

The invention comprises a U-shaped bracket generally designated by the reference character 16 having a pair of parallel arm portions 17 and 18 connected by a lower portion 19. The arm portion 17 is provided with an aperture for being received on one of the bolts 9 so that the U-shaped bracket 16 may be held in position on the upper portion 7 of the adjustable head by means of the nuts 10. Formed on the extreme upper end of the arm 18 is an offset portion 20 terminating in a pair of upstanding hinge eyes 21 as shown clearly in Fig. 2. A hinged plate 22 is provided adjacent its upper end with a pair of spaced lugs 23 having apertures 24 adapted to align with apertures 25 in the hinge eyes 21 so that a hinge pintle 26 may pass therethrough and hingedly support said hinged plate 22. The lower portion of the hinged plate 22 is slightly tapered as at 27 and is apertured as at 28 for receiving a bolt 29. A spring arm 30 is received in the bolt 29 and is held in place thereon by a nut 31. The extreme lower end of the tapered portion 27 is provided with a pair of oppositely disposed projections 32 engaging the edges of the spring 30 to hold the same centered and in position with the free ends of the spring arm 30 in contactual engagement with the front face of the hinged plate 11.

In order to maintain the spring arm 30 to exert tension upon the hinged plate 11, a U-shaped clip 33 is bolted or otherwise fastened in place as at 34 to the hinged arm 22 so that the opposite legs 35 and 36 of the U-shaped clip 33 will extend in the general direction of the U-shaped arm 18. The extreme free end of the legs 35 and 36 are bent inwardly as at 37 and 38 to provide gripping portions adapted to overlie the edges of the U-shaped arm 18 and thereby hold the hinged plate 22 in position.

A coil spring 39 has one of its ends fastened to the enlarged head of a bolt 40 extending through the U-shaped leg 35 and held in place by a nut 41 threadedly engaging the projecting portion of said nut. The opposite end of the spring is attached to an eye screw 42 which extends through an aperture in the U-shaped leg 36 and is adapted to be held in place by nuts or the like 43 on each side of said leg to securely lock the eye-screw in position. The legs 35 and 36 are drawn toward each other so that the gripping portions 37 and 38 thereof will fixedly engage the upstanding arm 18 of the U-shaped bracket 16 during the operation of the shaper. When it is desired to move the tool 44 carried by the free end of the tool post 13 by unloosening the screw 45 in the end thereof, the clamping bracket 33 is detached from the arm 18 so as to allow the hinged strap plate 22 to swing on its hinge pin 26. After this is accomplished, the shaper head hinged plate 11 may be swung upwardly upon its hinge pin 12. A lock nut 46 may be provided for locking the tool anchoring set screw 45 to insure against accidental displacement of the tool 44.

The lower portion 47 of the tool is adapted to traverse a piece of work and perform a cutting operation during reciprocation of the head 5 in one direction of its stroke.

It is to be understood, that the form of the invention herewith shown and described is to be taken as a preferred embodiment of the same and that various changes in the shape, size and arrangement of parts may be resorted to without departing from the spirit of the invention or the scope of the subjoined claims.

I claim:

1. A tool post hold-down for shaper machines comprising a bracket adapted to be attached to the reciprocating head of said machine, spring means carried by the bracket engaging the tool post support to yieldingly urge the tool post in a downward direction and means for rendering said spring means inoperative, said last-named means consisting of a quickly detachable member carried by the spring means for holding said spring means in a fixed position relative to said bracket.

2. A tool post hold-down for a shaper machine having a reciprocable tool head and a tool post support hinged thereto at its upper end, a bracket adapted to be attached to said head, yielding spring means carried by the bracket engaging the tool post support for urging said tool post downwardly and quick detachable means carried by the spring means engageable with said bracket for releasing said yielding spring means from engagement with said support, said spring means being arranged to exert a yielding spring force on the tool post in one direction.

3. A hold-down device for the tool post of a shaper machine having a reciprocable ram head and a tool post support hinged thereto at its upper end, a bracket removably attached to said ram head, resilient spring means hinged to said bracket operably engaging the tool post support for urging the tool post thereon in a downward direction and quick releasable means carried by said spring means for connecting the resilient spring means to the bracket, said resilient spring means being arranged so that one end will be fixed to the ram head when the quickly releasable means is in its locked position.

4. A tool post hold-down for shaper machines having a tool post supporting plate hinged to the upper portion of the head of said shaper machine comprising a bracket adapted to be removably attached to the head of said machine, resilient spring means carried by the bracket engaging the hinged tool post support of said machine for urging the tool post downward in the direction of the work, and means for releasing said spring means to facilitate the upward vertical swinging movement of the tool post support on its hinged connection when replacing a tool therein, said spring means being arranged so that one end is fixed to the ram head when the releasable means is connected.

5. A hold-down device for the tool post of a shaper machine in which the tool post is carried by a support hinged to the upper portion of said shaper machine ram head comprising a U-shaped bracket adapted to be removably fastened to the ram head of said machine, a spring arm hinged to said bracket for urging said tool post and tool post support downwardly and a quick release clamp carried by the spring arm adapted to engage the bracket and retain the spring arm in its operative position, said spring arm being arranged so that one end will be fixed when said quick release clamp is in clamping engagement with the bracket and the other end will be in contactual engagement with said shaper head.

6. A tool post hold-down for a shaper machine comprising a U-shaped bracket adapted to be removably attached to one of the adjusting bolts of the reciprocable ram head of said machine, a spring arm supported by said bracket operably engaging the hinged tool post support of said ram head and a quick release clamp carried by the spring arm for retaining the same in position relative to the bracket and the hinged tool post support whereby the tension on said tool post support may be relieved to facilitate the insertion and removal of a tool from said post.

7. A tool post hold-down for shaper machines comprising a U-shaped bracket adapted to be detachably fastened to one of the adjusting bolts of the shaper machine ram head, a spring arm hinged to said bracket and operably engaging the hinged tool post of the shaper machine head and a U-shaped clamp carried by the spring arm releasably engaging one arm of said U-shaped bracket to hold the tool post support downward.

8. A tool post hold-down for shaper machines comprising a U-shaped bracket adapted to be detachably fastened to one of the adjusting bolts of the shaper machine ram head, a spring arm hinged to said bracket and operably engaging the hinged tool post of the shaper machine head, a U-shaped clamp carried by the spring arm releasably engaging one arm of said U-shaped bracket to hold the tool post support downward and spring means for urging the arms of the U-shaped clamp toward each other and into frictional engagement with said bracket arm.

9. A tool post hold-down for a shaper machine comprising a bracket adapted to be attached to one of the adjusting bolts of the reciprocable ram head of said machine, a strap arm hinged to an offset portion of said bracket, a spring carried by said strap arm operably engaging the hinged tool post support of said shaping machine to normally urge the tool post downwardly and a quick release clamp carried by said strap arm frictionally engaging a portion of said bracket to releasably hold said spring in position.

10. A tool post hold-down for a shaper machine comprising a bracket adapted to be attached to one of the adjusting bolts of the reciprocable ram head of said machine, a strap arm hinged to an offset portion of said bracket, a spring carried by said strap arm operably engaging the hinged tool post support of said shaping machine to normally urge the tool post downwardly, a quick release clamp carried by said strap arm frictionally engaging a portion of said bracket to releasably hold said spring in position and means for urging said releasable clamp into frictional engagement with said bracket.

11. In combination with a shaper machine head having a hinged tool support and a tool post thereon, a U-shaped bracket removably attached to the head, a resilient spring member having its free end engaging the hinged tool post support for yieldingly urging the same downwardly and means for releasing the spring to allow the tool post support to be swung upwardly on its hinge joint to permit insertion and removal of a tool in said tool post, said last-named means being carried by the spring arm and engageable with the bracket to lock said spring arm in a fixed position with the free end yieldingly engaging said tool post.

12. In combination with a shaper machine head having a hinged tool post support pivoted to the upper portion of a shaper machine head, a bracket removably attached to the head, a resilient member connected to the bracket with its free end engaging said tool post support for urging said tool post downwardly and a clamp carried by said resilient member releasably engaging said bracket for rendering said resilient member inoperative to facilitate free, unrestrained swinging movement of the tool post, said clamp being arranged on the resilient member to hold one end thereof fixed to the ram head so that the free end may flex in the direction of shaper head movement.

13. In combination with a planing machine head having a hinged tool post support and a tool post carried thereby, a bracket detachably secured to the head, a resilient spring member carried by the bracket having its free end operatively engaging the hinged tool support and quickly detachable means carried by the spring member for frictionally engaging the bracket and retaining the resilient member in its operative position, said resilient spring member being arranged so that one end will be rigidly fixed to the planing machine head when the quickly detachable means is in frictional engagement with the bracket so that the free end may swing in a plane parallel with the swinging movement of the hinged tool post support.

14. In combination with a planing machine having a planing head and a pivoted tool post support, a U-shaped bracket removably attached to the head having an offset arm portion, a spring arm hinged to said offset arm portion with its free end operatively engaging the pivoted tool post support and a detachable clamp secured to the spring arm for frictionally engaging one of the legs of the U-shaped bracket and holding the spring arm in its operative position.

15. In combination with a planing machine having a planing head and a pivoted tool post support, a U-shaped bracket removably attached to the head having an offset arm portion, a spring arm hinged to said offset arm portion operatively engaging the pivoted tool post support and a U-shaped clamp carried by the spring arm frictionally engaging one of the arms of the U-shaped bracket.

FRANCIS JOHNSON.